United States Patent
Zhang

(10) Patent No.: US 8,384,796 B2
(45) Date of Patent: Feb. 26, 2013

(54) METHODS AND SYSTEMS FOR AUTOMATIC WHITE BALANCE

(75) Inventor: Buyue Zhang, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 79 days.

(21) Appl. No.: 13/011,693

(22) Filed: Jan. 21, 2011

(65) Prior Publication Data
US 2012/0188399 A1 Jul. 26, 2012

(51) Int. Cl.
*H04N 5/228* (2006.01)
(52) U.S. Cl. .................................... 348/222.1; 382/167
(58) Field of Classification Search .................. None
See application file for complete search history.

(56) References Cited

U.S. PATENT DOCUMENTS

| | | | |
|---|---|---|---|
| 6,928,187 B2 * | 8/2005 | Cooper et al. | 382/167 |
| 8,014,599 B2 * | 9/2011 | Ohga et al. | 382/167 |
| 2009/0147100 A1 * | 6/2009 | Nagamasa et al. | 348/223.1 |
| 2010/0020193 A1 | 1/2010 | Zhang et al. | |
| 2010/0103278 A1 * | 4/2010 | Suzuki | 348/222.1 |
| 2010/0149420 A1 | 6/2010 | Zhang et al. | |
| 2010/0194918 A1 | 8/2010 | Zhang et al. | |

OTHER PUBLICATIONS

Buyue Zhang, "Method and Systems for Automatic White Balance", U.S. Appl. No. 12/710,344, filed Feb. 22, 2010, pp. 1-34.

* cited by examiner

*Primary Examiner* — Chieh M Fan
*Assistant Examiner* — Wesley J Chiu
(74) *Attorney, Agent, or Firm* — Mirna Abyad; W. James Brady; Frederick J. Telecky, Jr.

(57) ABSTRACT

A method for compensating an automatic white balance (AWB) reference generated for a first image sensor is provided that includes computing a red adjustment factor, a green adjustment factor, and a blue adjustment factor based on an average red value, an average green value, and an average blue value of the first image sensor and an average red value, an average green value, and an average blue value of a second image sensor, and modifying a red value, a green value, a blue value, and chromaticity values of the AWB reference based on the red adjustment factor, the green adjustment factor, and the blue adjustment factor to generate a compensated reference for the second image sensor. A method for tuning AWB references based on changes in chromaticity values of the references is also provided.

15 Claims, 8 Drawing Sheets

METHODS AND SYSTEMS FOR AUTOMATIC WHITE BALANCE

CROSS-REFERENCE TO RELATED APPLICATIONS

This application is related to U.S. patent application Ser. No. 12/510,853, filed Jul. 28, 2009, which is incorporated by reference herein in its entirety. This application is also related to U.S. patent application Ser. No. 12/700,671, filed Feb. 4, 2010, U.S. patent application Ser. No. 12/710,344, filed Feb. 22, 2010, and U.S. patent application Ser. No. 13/011,653, filed Jan. 21, 2011, which are incorporated by reference herein in their entirety.

BACKGROUND OF THE INVENTION

White balance is the process of removing unrealistic color cast from a digital image caused by the color of the illumination. Human eyes automatically adapt to the color of the illumination, such that white will always appear white. Unfortunately, image capture devices (e.g., camera sensors) cannot adapt automatically. Therefore, white balance techniques are needed for image sensors in image capture systems (e.g., a digital camera) to compensate for the effect of illumination.

Automatic white balance (AWB) is an essential part of the imaging system pipeline in image capture systems. Digital still cameras and camera phones, for example, apply AWB techniques to correctly display the color of digital images. The performance of AWB has been a differentiating factor for different camera brands. Accordingly, improvements in AWB are desirable.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
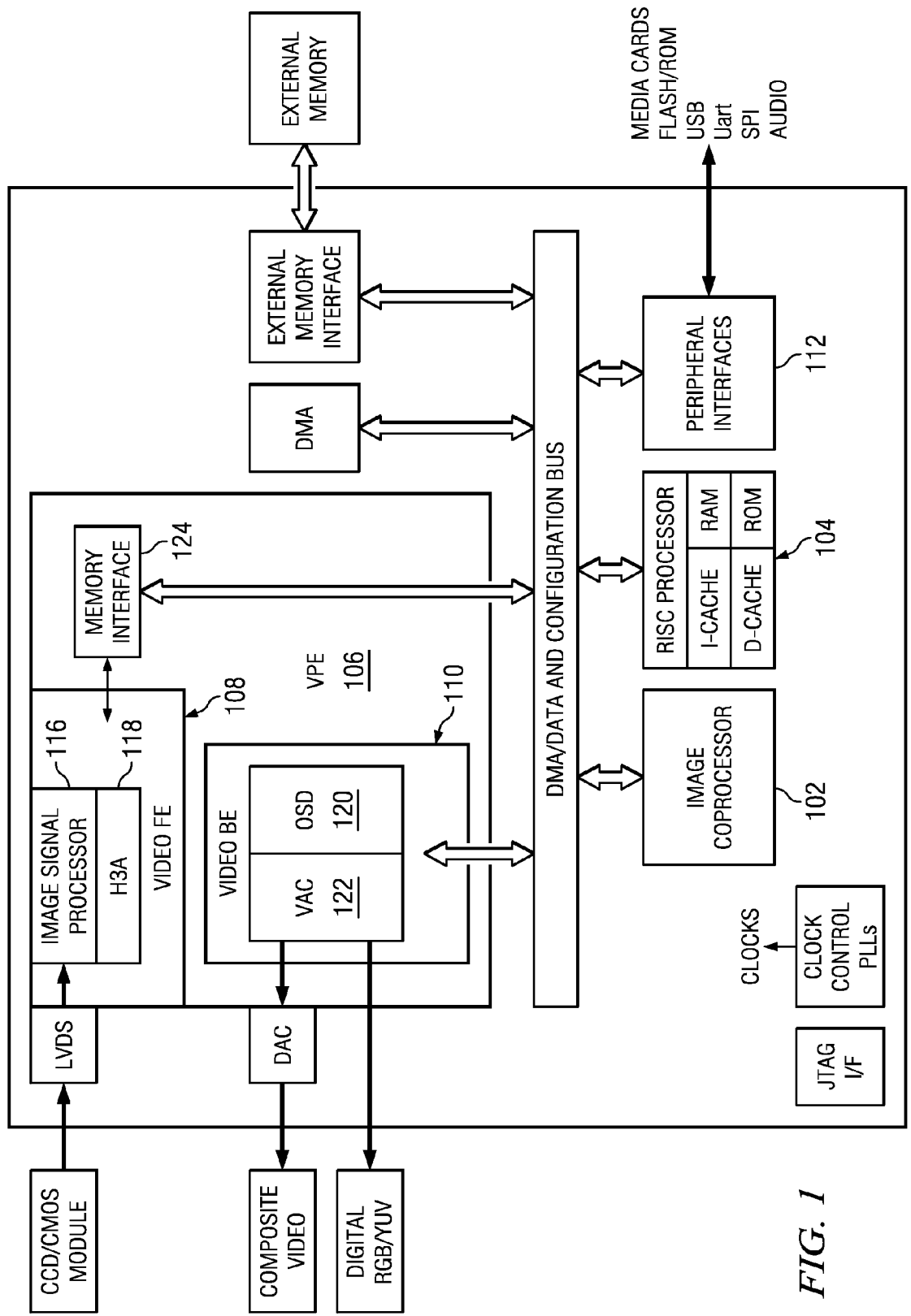
FIG. 1 shows a block diagram of a digital system in accordance with one or more embodiments of the invention.

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless connection. Thus, if a first device or component couples to a second device or component, that connection may be through a direct connection, through an indirect connection via other devices and connections, through an optical connection, and/or through a wireless connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, combined, and/or performed in a different order than the order shown in the figures and/or described herein. Accordingly, embodiments of the invention should not be considered limited to the specific ordering of steps shown in the figures and/or described herein.

In general, embodiments of the invention provide methods and systems for automatic white balance (AWB) in digital systems that capture digital images. In one or more embodiments of the invention, a digital image is a block of pixels such as single photograph, a subset of a photograph, a frame (or other subset) of a digital video sequence, etc. In one or more embodiments of the invention, a digital system that is configured to capture photographs and/or video sequences implements an automatic white balance (AWB) method that is calibrated with references generated by an embodiment of an AWB calibration method. The references may include references generated using a test target (e.g., a color checker) captured at different color temperatures under simulated and/or natural lighting conditions, i.e., color temperature references, references generated using scene prototypes, i.e., scene prototype references, references generated using a test target captured at different color temperatures under simulated and/or natural lighting conditions using a flash, i.e., flash references, etc.

A reference used in the reference-based AWB may include statistics (e.g., a histogram) of an image used to generate the reference and/or one or more gray values (e.g., R, G, B, Cb (blue difference chroma component), Cr (red difference chroma component) values extracted from gray areas in an image). In general, reference-based AWB techniques compare statistics extracted from an image (e.g., the current video frame) to statistics extracted from a set of references to determine which reference best matches the image and then perform white balance correction on the image based on the estimated scene illumination. U.S. patent application Ser. No. 12/510,853, U.S. patent application Ser. No. 12/700,671, U.S. patent application Ser. No. 12/710,344, and U.S. patent application Ser. No. 13/011,653 provide more detailed descriptions of example AWB techniques and AWB reference generation techniques that may be used in embodiments of the invention.

In some embodiments of the invention, AWB references are tuned to achieve desired color tone for the full color temperature range. More specifically, a representative set of raw images covering the full color temperature range are processed through the entire image pipe to generate JPEG or BMP images. The white balance processing of the image pipe performs white balancing using a set of AWB references. A user may then view the resulting images to determine if the white balance results are acceptable. If the user does not find the results acceptable, the user may make adjustments to one or more of the AWB references to change the chromaticity of those references, thus affecting the resulting color tone of images white balanced using those references. For example, the user may view a graphical representation of a curve showing the white balance references in the chromaticity plane, e.g., the Cb-Cr plane, and indicate adjustments in the chromaticity of one or more of the references by moving the points corresponding to those references. The changes in position of the points may then be used to compute relative adjustments to the references. The adjusted references may then be used to white balance the images again. The user may repeat this process until the AWB references are sufficiently tuned to achieve the user-desired color tone.

In one or more embodiments of the invention, the AWB references are adjusted prior to use in AWB to compensate for variations in individual image sensor characteristics to achieve higher accuracy in AWB. For example, in some embodiments of the invention, the AWB references are first generated using an image sensor that exhibits typical characteristics of the model of image sensor to be used in the manufacture of a digital system. This typical image sensor is often referred to as a "Golden Sample" or "Golden Sensor". However, in mass production, each individual image sensor, although of the same model as the Golden Sensor, may have characteristics that vary from those of the Golden Sensor. These variations may affect the accuracy of AWB. Thus, the AWB references may need to be adjusted (i.e., compensated) for each individual image sensor if greater accuracy is desired.

FIG. 1 shows a digital system suitable for an embedded system (e.g., a digital camera) in accordance with one or more embodiments of the invention that includes, among other components, a DSP-based image coprocessor (ICP) (102), a RISC processor (104), and a video processing engine (VPE) (106) that may be configured to perform an AWB method as described herein. The RISC processor (104) may be any suitably configured RISC processor. The VPE (106) includes a configurable video processing front-end (Video FE) (108) input interface used for video capture from imaging peripherals such as image sensors, video decoders, etc., a configurable video processing back-end (Video BE) (110) output interface used for display devices such as SDTV displays, digital LCD panels, HDTV video encoders, etc, and memory interface (124) shared by the Video FE (108) and the Video BE (110). The digital system also includes peripheral interfaces (112) for various peripherals that may include a multimedia card, an audio serial port, a Universal Serial Bus (USB) controller, a serial port interface, etc.

The Video FE (108) includes an image signal processor (ISP) (116), and an H3A statistic generator (H3A) (118). The ISP (116) provides an interface to image sensors and digital video sources. More specifically, the ISP (116) may accept raw image/video data from a sensor module (126) (e.g., CMOS or CCD) and can accept YUV video data in numerous formats. The ISP (116) also includes a parameterized image processing module with functionality to generate image data in a color format (e.g., RGB) from raw CCD/CMOS data. The ISP (116) is customizable for each sensor type and supports video frame rates for preview displays of captured digital images and for video recording modes. The ISP (116) also includes, among other functionality, an image resizer, statistics collection functionality, and a boundary signal calculator. The H3A module (118) includes functionality to support control loops for auto focus, auto white balance, and auto exposure by collecting metrics on the raw image data from the ISP (116) or external memory. In one or more embodiments of the invention, the Video FE (108) is configured to perform an AWB method using references tuned and/or compensated as described herein. In some embodiments of the invention, the Video FE (108) is configured to perform a method to compensate AWB references prior to use in AWB as described herein.

The Video BE (110) includes an on-screen display engine (OSD) (120) and a video analog encoder (VAC) (122). The OSD engine (120) includes functionality to manage display data in various formats for several different types of hardware display windows and it also handles gathering and blending of video data and display/bitmap data into a single display window before providing the data to the VAC (122) in a color space format (e.g., RGB, YUV, YCbCr). The VAC (122) includes functionality to take the display frame from the OSD engine (120) and format it into the desired output format and output signals required to interface to display devices. The VAC (122) may interface to composite NTSC/PAL video devices, S-Video devices, digital LCD devices, high-definition video encoders, DVI/HDMI devices, etc.

The memory interface (124) functions as the primary source and sink to modules in the Video FE (108) and the Video BE (110) that are requesting and/or transferring data to/from external memory. The memory interface (124) includes read and write buffers and arbitration logic.

The ICP (102) includes functionality to perform the computational operations required for compression and other processing of captured images. The video compression standards supported may include, for example, one or more of the JPEG standards, the MPEG standards, and the H.26x standards. In one or more embodiments of the invention, the ICP (102) is configured to perform computational operations of AWB method using references tuned and/or compensated as described herein as described herein. In some embodiments of the invention, the ICP (102) is configured to perform computational operations of a method for compensation of AWB references as described herein.

In operation, to capture a photograph or video sequence, video signals are received by the video FE (108) and converted to the input format needed to perform video compression. Prior to the compression, an AWB method as described herein may be applied as part of processing the captured video data. In some embodiments of the invention, the references used by AWB have been tuned using a method for AWB reference tuning as described herein. Further, in some embodiments of the invention, prior to the first use of AWB (e.g., when the digital system is activated), a method for compensation of AWB references is performed to adjust the references for the image sensor used in the digital system. In some embodiments of the invention, the AWB references are compensated for the image sensor during the manufacturing process using a method for AWB reference compensation as described herein and the compensated references are stored on the digital system. The video data generated by the video FE (108) is stored in the external memory. The video data is then encoded, i.e., compressed. During the compression process, the video data is read from the external memory and the compression computations on this video data are performed by the ICP (102). The resulting compressed video data is stored in the external memory. The compressed video data is then read from the external memory, decoded, and post-processed by the video BE (110) to display the image/video sequence.

Figure 2:
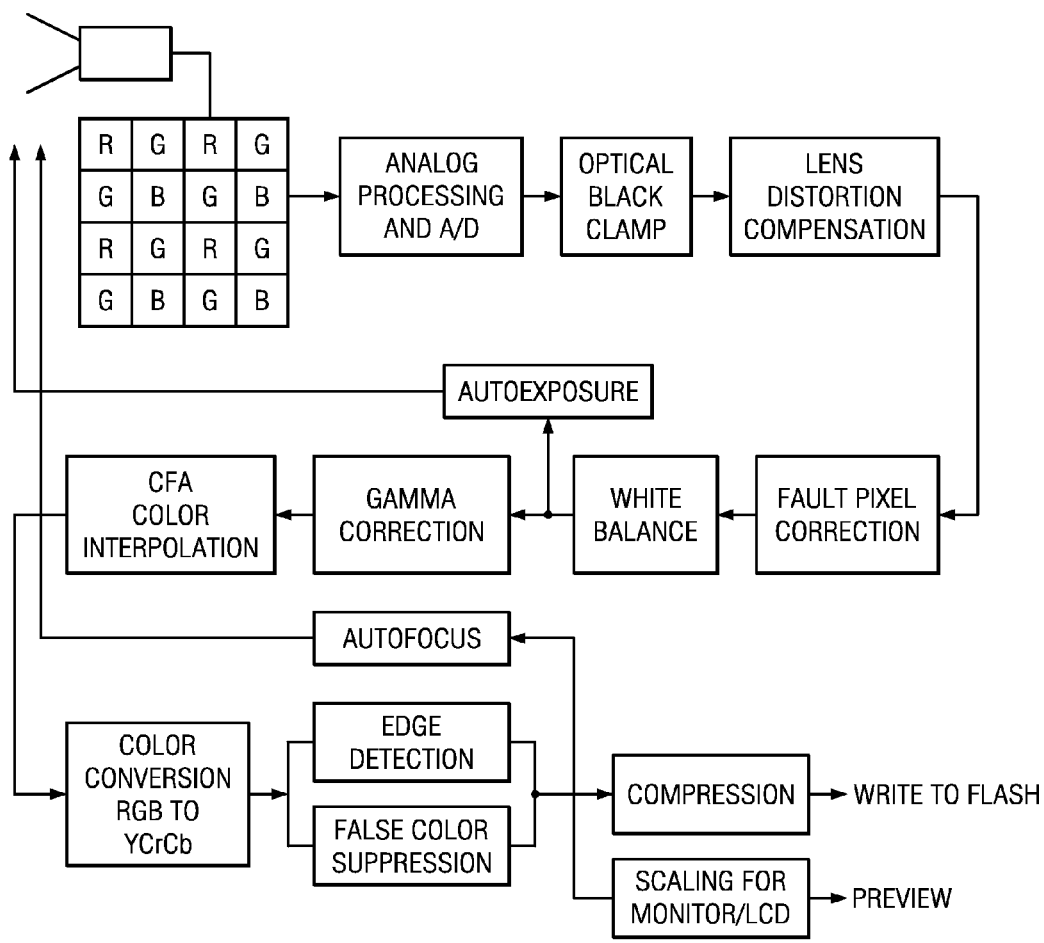
FIG. 2 shows a block diagram of an image processing pipeline in accordance with one or more embodiments of the invention.

FIG. 2 is a block diagram illustrating digital camera control and image processing (the "image pipeline") in accordance with one or more embodiments of the invention. One of ordinary skill in the art will understand that similar functionality may also be present in other digital systems (e.g., a cell phone, PDA, a desktop or laptop computer, etc.) capable of capturing digital photographs and/or digital video sequences. The automatic focus, automatic exposure, and automatic white balancing are referred to as the 3A functions; and the image processing includes functions such as color filter array (CFA) interpolation, gamma correction, white balancing, color space conversion, and compression/decompression (e.g., JPEG for single photographs and MPEG for video sequences). A brief description of the function of each block in accordance with one or more embodiments is provided below. Note that the typical color image sensor (e.g., CMOS or CCD) includes a rectangular array of photosites (i.e., pixels) with each photosite covered by a filter (the CFA): typically, red, green, or blue. In the commonly-used Bayer pattern CFA, one-half of the photosites are green, one-quarter are red, and one-quarter are blue.

To optimize the dynamic range of the pixel values represented by the imager of the digital camera, the pixels representing black need to be corrected since the imager still records some non-zero current at these pixel locations. The black clamp function adjusts for this difference by subtracting an offset from each pixel value, but clamping/clipping to zero to avoid a negative result.

Imperfections in the digital camera lens introduce nonlinearities in the brightness of the image. These nonlinearities reduce the brightness from the center of the image to the border of the image. The lens distortion compensation function compensates for the lens by adjusting the brightness of each pixel depending on its spatial location.

Photosite arrays having large numbers of pixels may have defective pixels. The fault pixel correction function interpolates the missing pixels with an interpolation scheme to provide the rest of the image processing data values at each pixel location.

The illumination during the recording of a scene is different from the illumination when viewing a picture. This results in a different color appearance that may be seen as the bluish appearance of a face or the reddish appearance of the sky. Also, the sensitivity of each color channel varies such that grey or neutral colors may not be represented correctly. In one or more embodiments of the invention, the white balance function compensates for these imbalances in colors in accordance with an AWB method as described herein. In some embodiments of the invention, the white balance function uses references that have been compensated for the image sensor in accordance with an AWB reference compensation method described herein. In some embodiments of the invention, the white balance function uses references that have been tuned in accordance with an AWB reference tuning method described herein.

Due to the nature of a color filter array, at any given pixel location, there is information regarding one color (R, G, or B in the case of a Bayer pattern). However, the image pipeline needs full color resolution (R, G, and B) at each pixel in the image. The CFA color interpolation function reconstructs the two missing pixel colors by interpolating the neighboring pixels.

Display devices used for image-viewing and printers used for image hardcopy have a nonlinear mapping between the image gray value and the actual displayed pixel intensities. The gamma correction function (also referred to as adaptive gamma correction, tone correction, tone adjustment, contrast/brightness correction, etc.) compensates for the differences between the images generated by the image sensor and the image displayed on a monitor or printed into a page.

Typical image-compression algorithms such as JPEG operate on the YCbCr color space. The color space conversion function transforms the image from an RGB color space to a YCbCr color space. This conversion may be a linear transformation of each Y, Cb, and Cr value as a weighted sum of the R, G, and B values at that pixel location.

The nature of CFA interpolation filters introduces a low-pass filter that smoothes the edges in the image. To sharpen the images, the edge detection function computes the edge magnitude in the Y channel at each pixel. The edge magnitude is then scaled and added to the original luminance (Y) image to enhance the sharpness of the image.

Edge enhancement is performed in the Y channel of the image. This leads to misalignment in the color channels at the edges, resulting in rainbow-like artifacts. The false color suppression function suppresses the color components, Cb and Cr, at the edges reduces these artifacts.

The autofocus function automatically adjusts the lens focus in a digital camera through image processing. These autofocus mechanisms operate in a feedback loop. They perform image processing to detect the quality of lens focus and move the lens motor iteratively until the image comes sharply into focus.

Due to varying scene brightness, to get a good overall image quality, it is necessary to control the exposure of the image sensor. The autoexposure function senses the average scene brightness and appropriately adjusting the image sensor exposure time and/or gain. Similar to autofocus, this operation is also in a closed-loop feedback fashion.

Most digital cameras are limited in the amount of memory available on the camera; hence, the image compression function is employed to reduce the memory requirements of captured images and to reduce transfer time.

Figure 3:
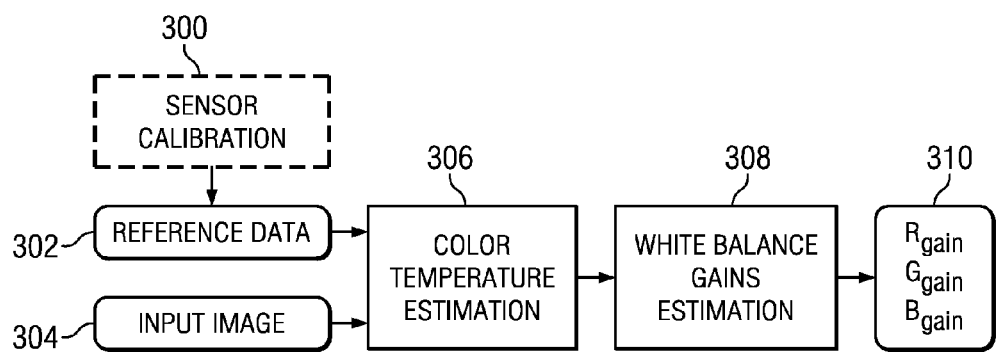
FIG. 3 shows a block diagram of automatic white balance (AWB) flow in accordance with one or more embodiments of the invention.

FIG. 3 is a block diagram of AWB flow in accordance with one or more embodiments of the invention. Initially, sensor calibration is performed (300) to produce reference data (302) for calibration of an embodiment of an AWB method. The sensor calibration may be performed in accordance with an embodiment of a method for AWB calibration as described herein. Other examples of AWB calibration methods may be found in U.S. patent application Ser. No. 12/510,853, U.S. patent application Ser. No. 12/700,671, U.S. patent application Ser. No. 12/710,344, and U.S. patent application Ser. No. 13/011,653. In one or more embodiments of the invention, the sensor calibration is performed using an AWB simulation system and an AWB calibration system and the resulting reference data (302) is integrated into a digital system (e.g., the digital systems of FIGS. 1, 11, and 12) implementing an embodiment of an AWB method as described herein.

The reference data (302) may include any suitable references, such as, for example, color temperature references, scene prototype references, flash references, and the like. Some suitable techniques for generation of color temperature references and scene prototype references are described in U.S. patent application Ser. No. 12/700,671 and U.S. patent application Ser. No. 12/710,344. A suitable technique for generation of flash references is described U.S. patent application Ser. No. 13/011,653.

In one or more embodiments of the invention, the reference data (302) is adjusted prior to being used for actual white balancing to compensate for image sensor variation. More specifically, the reference data (302) is generated using images captured by an image sensor (e.g., a Golden Sensor) of a particular model of image sensor. While the image sensor used to capture the reference images is representative of the particular model of image sensor used for capturing the input image (304), the characteristics of the actual image sensor used for capturing may vary from those of the image sensor used to generate the reference data. To provide for more accurate AWB, the reference data (302) is adjusted, i.e., compensated, for the actual image sensor. A method and system for adjusting reference data to compensate for image sensor variation are described in more detail below in reference to FIGS. 8 and 9.

In some embodiments of the invention, as part of the sensor calibration (300), the reference data (302) is tuned to achieve a desired color tone for the full color temperature range. A method for tuning reference data is described in more detail below in reference to FIG. 6.

The reference data (302) is then used to perform automatic white balancing on an input image (304). The automatic white balancing includes performing color temperature estimation (306) and white balance gains estimation (308) using the reference data (302) and the input image (304). Suitable methods for color temperature estimation and white balance gains estimation are described in U.S. patent application Ser. No. 12/510,853. The outputs of the color temperature estimation (306) and white balance gains estimation (308) include the gains ($R_{gain}$, $G_{gain}$, $B_{gain}$) to be applied to the color channels of the image (304) to generate a white balanced image. For example, a white balanced image may be obtained by individually scaling the R, G, and B channels of the image with the $R_{gain}$, $G_{gain}$, and $B_{gain}$ values as follows:

$$\begin{bmatrix} R_{adapt} \\ G_{adapt} \\ B_{adapt} \end{bmatrix} = \begin{bmatrix} R_{gain} & 0 & 0 \\ 0 & G_{gain} & 0 \\ 0 & 0 & B_{gain} \end{bmatrix} \begin{bmatrix} R_{input} \\ G_{input} \\ B_{input} \end{bmatrix}$$

where $R_{input}$, $G_{input}$, and $B_{input}$ are the R, G, and B values of the input pixels and $R_{adapt}$, $G_{adapt}$, and $B_{adapt}$ are the resulting R, G, and B values with the computed gains applied.

Figure 4A:
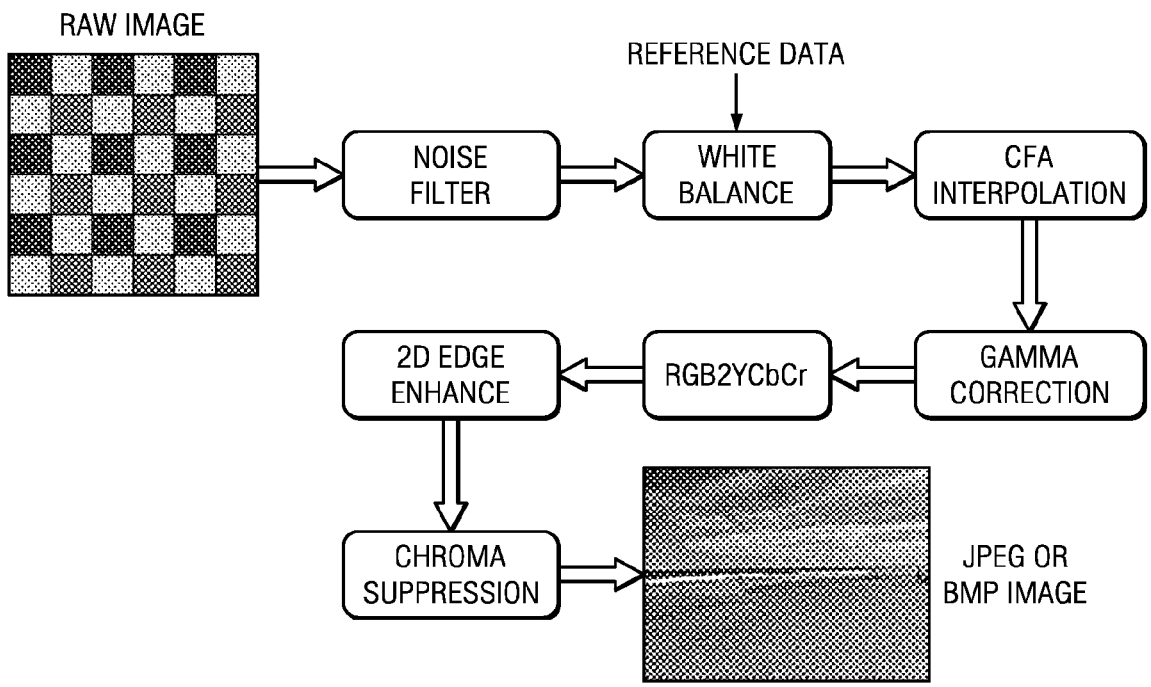
FIGS. 4A and 4B show block diagrams of a simulation system in accordance with one or more embodiments of the invention.
Figure 4B:
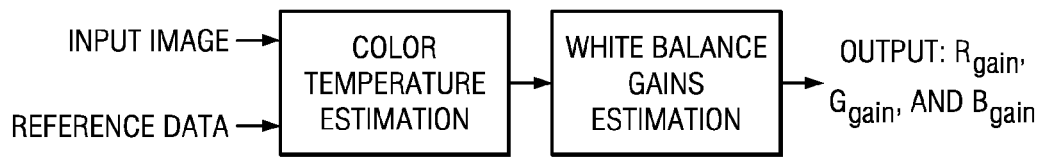

FIGS. 4A and 4B show block diagrams of a simulation system for automatic white balance calibration in accordance with one or more embodiments of the invention. In general, the simulation system simulates image pipeline processing. In some embodiments of the invention, the components of the simulation system shown in FIG. 4A simulate the functionality of image pipeline processing components in a target digital system (e.g., the digital systems of FIGS. 1, 11, and 12) to support tuning, testing, calibration, etc. of the various components using one or more test suites of digital images. In one or more embodiments of the invention, the components of the simulation system of FIG. 4A simulate functionality of similarly named components in the image pipeline of FIG. 2.

Further, in some embodiments of the invention, as shown in FIG. 4B, the white balance component of FIG. 4A simulates an automatic white balance method that includes color temperature estimation and white balance gains estimation using reference data and the input image. Suitable methods for color temperature estimation and white balance gains estimation are described in U.S. patent application Ser. No. 12/510,853. The outputs of the color temperature estimation and white balance gains estimation include the gains ($R_{gain}$, $G_{gain}$, and $B_{gain}$) to be applied to the color channels of the image to generate a white balanced image.

Figure 4C:
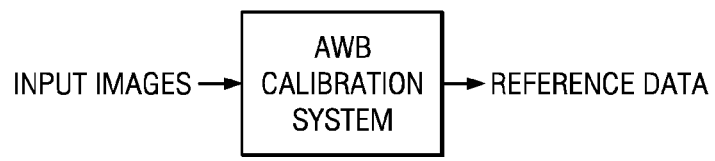
FIG. 4C shows a block diagram of an automatic white balance calibration system in accordance with one or more embodiments of the invention.

FIG. 4C is a block diagram of an AWB calibration system in accordance with one or more embodiments of the invention. In general, the AWB calibration system accepts input images captured with an image sensor and uses those images to generate reference data for calibrating AWB in a digital system having the type (model) of image sensor used to capture the images. The reference data may include image statistics for each input image and/or gray values, i.e., R, G, B, Cb, and Cr values of one or more gray levels extracted from gray patches. In some embodiments of the invention, the image statistics are histograms. The image sensor used to capture the input images may be a Golden Sample of the same model of image sensor to be used in the digital system. Techniques for generation of reference data that may be used by the AWB calibration system are described in more detail in U.S. patent application Ser. No. 12/510,853, U.S. patent application Ser. No. 12/700,671, U.S. patent application Ser. No. 12/710,344, and U.S. patent application Ser. No. 13/011,653.

Figure 5:
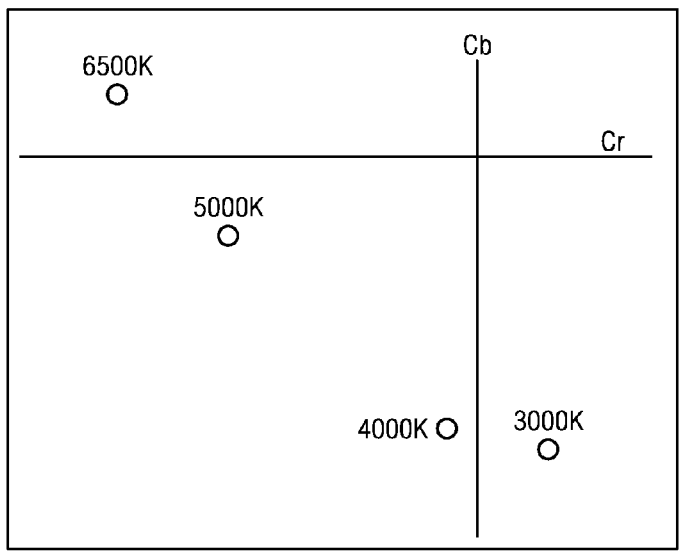
FIG. 5 shows examples of AWB references in accordance with one or more embodiments of the invention.

FIG. 5 shows points in the Cr-Cb chromaticity plane corresponding to four AWB references for four respective color temperatures, 6500K, 500K, 400K, and 3000K. The location of each point is determined by the Cb (blue difference chroma component) and Cr (red difference chroma component) values in the corresponding AWB reference. In general, the location of each of these reference points in the plane is determined by the color temperature of the illumination and the optical characteristics of the image sensor used to capture the images used to generate the references. Further, as the following analysis shows, the location of these references in the chromaticity plane determines the color tone of images white balanced using these references by affecting the $R_{gain}$, $G_{gain}$, and $B_{gain}$ applied to R, G, and B channels respectively.

In one or more embodiments of the invention, each AWB reference includes statistics such as a histogram and a set of gray values that include an average R value, an average G value, and an average G value determined from the image used to generate the reference. The set of gray values also includes a Cb and a Cr value computed from the R, G, B values. The conversion of the R, G, B values to Y, Cb, Cr is given by Eqs. (1)-(3):

$$Y = \frac{77R + 150G + 29B + 128}{256} \quad (1)$$

$$C_b = \frac{-43R - 85G + 128B}{Y + 1} \quad (2)$$

$$C_r = \frac{128R - 107G - 21B}{Y + 1} \quad (3)$$

The scale factors used in the above equations may be known industry standard scale factors for converting from R, G, B to Cb and Cr or may be empirically derived scale factors. In the above equations, Cb and Cr are normalized by the luminance Y. In other embodiments of the invention, Cb and Cr may be computed as shown above without normalization by Y.

Further, the inverse transformation from Y, Cb, Cr to R, G, B is given by Eqs. (4)-(6):

$$R = Y + 0.0055 C_r \cdot Y \quad (4)$$

$$G = Y + 0.0013 C_b \cdot Y - 0.0028 C_r \cdot Y \quad (5)$$

$$B = Y + 0.0069 C_b \cdot Y \quad (6)$$

Assume Cr is shifted by $\Delta Cr$, and Cb is shifted by $\Delta Cb$ on the Cr-Cb chromaticity plane shown in FIG. 5, and Y remains the same. The R, G, B values for the new Cr and Cb values, designated as R', G', B', are given by Eqs. (7)-(9):

$$R' = Y + 0.0055 (C_r + \Delta C_r) \cdot Y \quad (7)$$

$$G' = Y - 0.0013 (C_b + \Delta C_b) \cdot Y - 0.0028 (C_r + \Delta C_r) \cdot Y \quad (8)$$

$$B' = Y + 0.0069 (C_b + \Delta C_b) \cdot Y \quad (9)$$

Accordingly, the changes in the R, G, B values of a reference, designated as $\Delta R$, $\Delta G$, $\Delta B$, caused by the shifting of Cr and Cb are given by Eqs. (10)-(12).

$$\Delta R = R' - R = 0.0055 \Delta C_r \cdot Y \quad (10)$$

$$\Delta G = G' - G = -0.0013 \Delta C_b \cdot Y - 0.0028 \Delta C_r \cdot Y \quad (11)$$

$$\Delta B = B' - B = 0.0069 \Delta C_b \cdot Y \quad (12)$$

Eqs. (13)-(15) may be used to compute the white balance gains $R_{gain}$, $G_{gain}$, and $B_{gain}$ during AWB. As can be seen from these equations, $R_{gain}$, $G_{gain}$, and $B_{gain}$ are closely related to the R, G, B values of the reference used to determine the white balance gains.

$$R_{gain} = \frac{G}{R} \quad (13)$$

$$B_{gain} = \frac{G}{B} \quad (14)$$

$$G_{gain} = \frac{G}{G} = 1.0 \quad (15)$$

According to Eqs. (10), (11), and (13), if Cr increases, R will increase and G will decrease. Thus, the resulting white balance gain for the R channel $R_{gain}$ will decrease. This will lead to a cooler tone (more bluish) in the white balance corrected image. On the other hand, reducing Cr will lead to a warmer tone. Further, according to Eqs. (11), (12), and (15), if Cb increases, B will increase and G will decrease, resulting in a decrease in $B_{gain}$. This will lead to a warmer tone (more reddish) in the white balance corrected image. On the other hand, reducing Cb will lead to a cooler tone.

Figure 6:
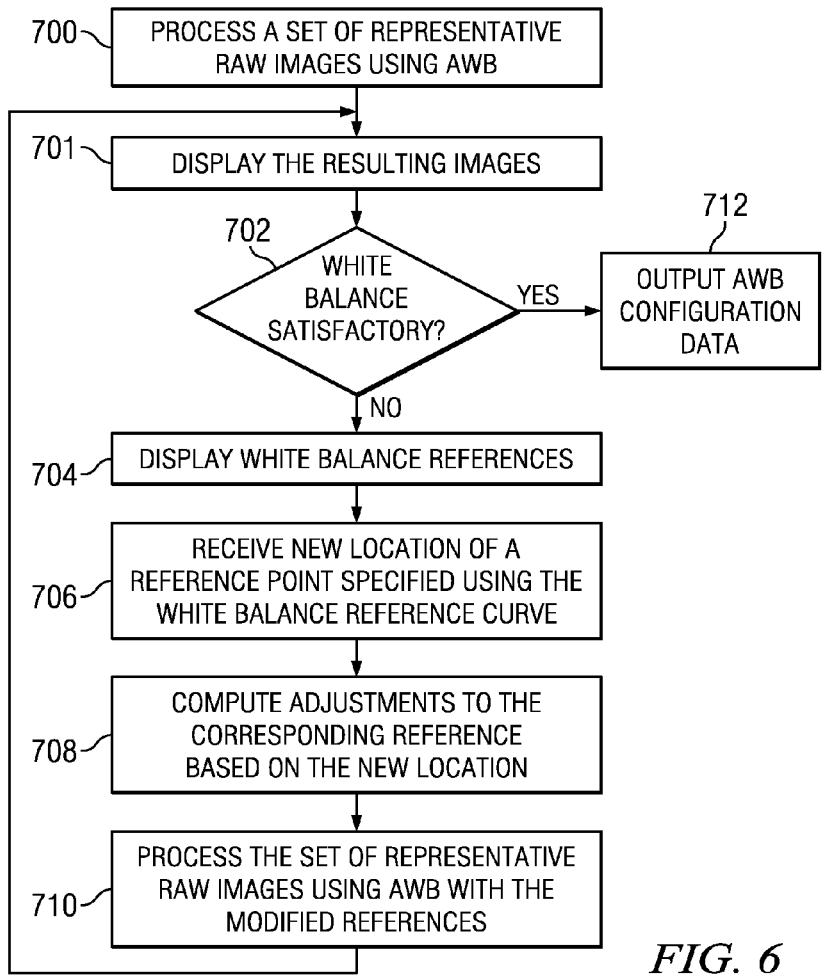
FIG. 6 shows a flow graph of a method for AWB reference tuning in accordance with one or more embodiments of the invention.

FIG. 6 shows a flow diagram of a method for tuning white balance references in accordance with one or more embodiments of the invention. This method builds on the above analysis and may be used to adjust a set of white balance references to achieve a desired color tone for the entire color temperature range. For simplicity and clarity of explanation, the method is described for adjusting a single reference. One of ordinary skill in the art will understand embodiments in which multiple references are changed.

As shown in FIG. 6, initially a set of representative raw images is processed through an image pipe, e.g., the image pipe of FIG. 4A, to generate final images, e.g., JPEG or BMP images (700). The image pipe applies AWB with a set of references to the images during the processing. In some embodiments of the invention, the set of representative raw images is captured by the same image sensor used to capture the images for generation of the references. The representative set of raw images may be representative of the types of pictures that would be taken by the user of a digital system having the same type of image sensor used in generating the references, e.g., a landscape image captured in sunlight and/or shade, a group of people captured under incandescent and/or fluorescent light, etc. Further, the representative set of images may cover the full color temperature range, e.g., from around 7000K (outdoor cloudy) to 2800K (incandescent). In some embodiments of the invention, the representative set of raw images is the same set of images used in generating the references.

The processed images are then displayed for examination by a user (701). For example, the images may be processed using a simulation system, e.g., the simulation system of FIGS. 4A and 4B, and displayed on a display device included in the simulation system. The user may examine the images and make a determination as to whether the AWB has produced a satisfactory result, e.g., that the color tone of the images is satisfactory (702). If the AWB performance is satisfactory, then the AWB configuration data for the references is output (712).

If the AWB performance is not satisfactory, then the user may make adjustments in the Cr and Cb values of one or more of the references to tune the chromaticity effect of those references. To aid in the tuning, a white balance reference curve, e.g., a curve such as that in FIG. 6, 9A, or 9B may be displayed for the user (704). The white balance reference curve shows a reference point in the Cr-Cb chromaticity plane for each reference in the set of references used to white balance the images. More specifically, the Cr and Cb parameters in each reference determine the location of the reference point for that reference in the Cr-Cb chromaticity plane. In some embodiments of the invention, the white balance curve and one or more of the processed images may be displayed concurrently.

Using a Graphic User Interface (GUI) based software tool, the user may change the relative location of a reference point in the white balance curve to specify an adjustment to the color tone of images white balanced using the corresponding reference (706). Adjustments to the Cr, Cb, R, G, and B values of the corresponding reference may then be computed based on the new location of the reference point in the chromaticity plane (708). The adjustments to the current R, G, B values, i.e., $\Delta R$, $\Delta G$, $\Delta B$, may be computed as changes to the current values based on the user-specified Cr and Cb as per Eqs. (10)-(12). Note that $\Delta Cr$ and $\Delta Cb$ in these equations may be determined as the difference between the Cr and Cb values of the reference and the user-specified Cr and Cb values. Y is assumed to remain the same. New R, G, B values for the reference, may then be computed as the difference between the current R, G, B values and the $\Delta R$, $\Delta G$, $\Delta B$ values, respectively. The reference in the set of references may then be updated with the user-specified Cr and Cb and the new R, G, B values to generate a tuned set of references.

After the reference is updated, the set of representative raw images is processed through the image pipe again to generate final images (710). The image pipe applies AWB with the tuned set of references to the images during the processing. The resulting images are again displayed for examination by the user (701). The user may repeat steps 701-710 until the references have been tuned to generate the desired color tone.

In some embodiments of the invention, the user may directly enter values for ΔCr and ΔCb, or new values for Cb and Cr instead of using a graphic user interface to adjust points on a white balance curve.

Image sensors of the same model may exhibit different optical characteristics, a phenomenon referred to as sensor module variation. This phenomenon may affect white balance accuracy as white balance is generally calibrated with one particular image sensor module, e.g., a Golden Sensor, resulting in one set of white balance references. Sensor module variation may cause the references to shift location on the chromaticity plane. As a result, when applying white balance references calibrated using one image sensor module to images captured using a different image sensor module, albeit of the same model, white balance accuracy may decrease.

Figure 7:
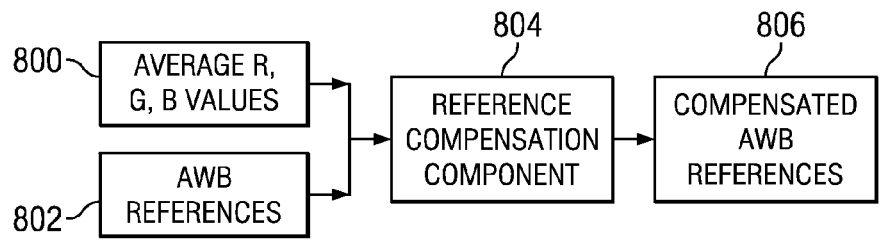
FIG. 7 shows a block diagram of an AWB reference compensation system in accordance with one or more embodiments of the invention.

FIG. 7 is a block diagram of a reference compensation system for AWB calibration in accordance with one or more embodiments of the invention. In general, the reference compensation system adjusts AWB references generated using an image sensor (e.g., a Golden Sensor) into AWB references for another image sensor of the same model, i.e., a target image sensor, based on average R, G, B values determined for each of the sensors. Determination of the average R, G, B values is described herein in reference to FIG. 8. As shown in FIG. 7, the average R, G, B values (800) and the original AWB references (802) are provided to a reference compensation component (804). Additional adjustment factors affecting the strength of adjustment may also be provided for each of the original AWB references. These additional adjustment factors are described herein in reference to FIG. 8. The original AWB references (802) are references generated as described herein and include histograms and one or more gray values, e.g., R, G, B, Cb, Cr.

The reference compensation component (804) uses the average R, G, B values (and the additional adjustment factors, if provided) to adjust the gray values in the original AWB references generated using the original image sensor for use with the target image sensor. Determination of the adjusted gray values is described herein in reference to FIG. 8. The output of the reference compensation component (804) is compensated AWB references, i.e., original AWB references with compensated gray values (806), which may be used by AWB in a digital system that incorporates the target image sensor.

In one or more embodiments of the invention, the reference compensation component (804) is included in the digital system and is used to compensate the original AWB references prior to the initial use of AWB in the digital system after the digital system is activated (e.g., each time a digital camera is turned on). In such embodiments, the original AWB references and the average R, G, B values are stored in the digital system. In some such embodiments, the additional adjustment factors are also stored in the digital system.

In some embodiments of the invention, the reference compensation component may be included in a system used to calibrate individual image sensors during manufacture of digital systems incorporating the image sensors. In such embodiments, the original AWB references are compensated for a particular image sensor, i.e., the target image sensor, using average R, G, B values for the target image sensor and average R, G, B values for the original sensor. The compensated AWB references are then stored in the digital system incorporating the target image sensor.

Figure 8:
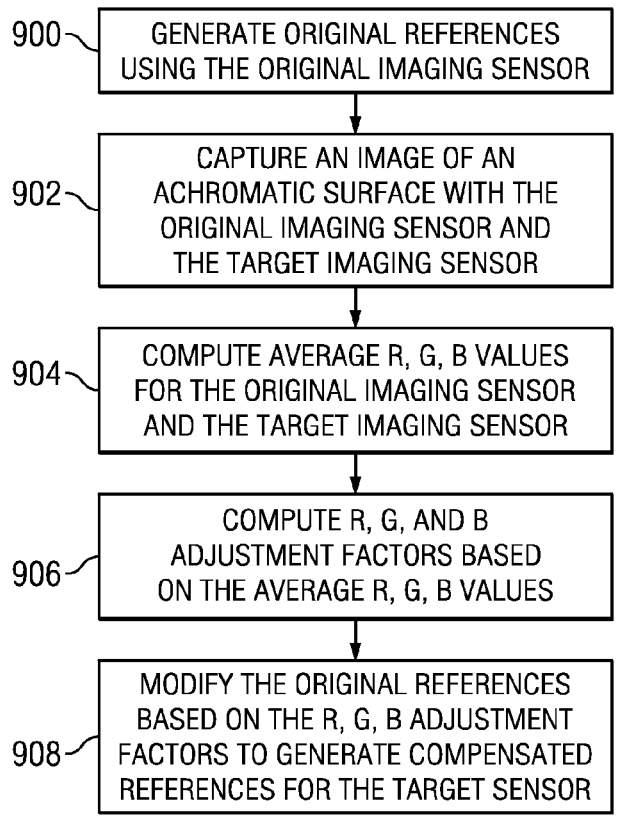
FIG. 8 shows a flow graph of a method for AWB reference compensation in accordance with one or more embodiments of the invention.

FIG. 8 shows a flow diagram of a method for compensating white balance references for individual image sensors in accordance with one or more embodiments of the invention. Initially, original AWB references are generated using an original image sensor representative of the characteristics of a model of image sensors, e.g., a Golden Sensor (900). In some embodiments of the invention, the original AWB references may be tuned according to the reference tuning method of FIG. 6. Then, an image of an achromatic surface (e.g., a gray patch) is captured with the original image sensor and with the target image sensor (902). Both images of the achromatic surface are captured at the same color temperature, e.g., 5000K, which may be selected from the set of color temperatures used in generating the original references. The set of color temperatures may include, for example, one or more of A (2800K), U30 (3000K), CWF (4200K), TL84 (3800K), D50 (5000K), D65 (6500K), and D75 (7500K). The choice of which color temperature to use is empirical. In general, the color temperature used will not be the highest or the lowest of the set of color temperatures, but somewhere in the middle.

Average R, G, B values for the original image sensor and the target sensor are then computed from the respective images (904). In some embodiments of the invention, the average R, G, B values for an image are computed as the averages of the R, G, B values of pixels in the image. In some embodiments of the invention, only a selected subset of the pixels (e.g., a center block of pixels in the image) is used to compute the average R, G, B values of the image.

R, G, and B adjustment factors, $R_{adjust}^i$, $G_{adjust}^i$, and $B_{adjust}^i$ (i=1, 2, ..., N), are then computed for each of the N original references based on the average R, G, B values of the original image sensor and the average R, G, B values of the target image sensor (906). The adjustment factors are computed as per Eqs. (16)-(18) in which Rg, Gg, Bg are the average R, G, B values of the original image sensor, i.e., the Golden sensor, Rc, Gc, Bc are the average R, G, B values of the target image sensor, i.e., the current sensor, and $k_i$ is the adjustment strength for the i-th reference, i=1, 2, ..., N. The adjustment strength $k_i$ (i=1, 2, ... N) determines how much adjustment each reference receives. When $k_i$=1.0, the adjustment is performed at full strength. When $k_i$=0.0, the reference is not adjusted. The values of the $k_i$ may be empirically determined.

$$R_{adjust}^i = \begin{cases} k_i \frac{R_c}{R_g}, & k_i \neq 0 \\ 1.0, & k_i = 0, \end{cases} \quad (16)$$

$$G_{adjust}^i = \begin{cases} k_i \frac{G_c}{G_g}, & k_i \neq 0 \\ 1.0, & k_i = 0, \end{cases} \quad (17)$$

$$B_{adjust}^i = \begin{cases} k_i \frac{B_c}{B_g}, & k_i \neq 0 \\ 1.0, & k_i = 0, \end{cases} \quad (18)$$

The original references are then modified based on the computed R, G, B adjustment factors $R_{adjust}^i$, $G_{adjust}^i$, and $B_{adjust}^i$ to generate compensated references for the target sensor (908). That is, compensated gray values R, G, B, Cb, and Cr are computed for the compensated reference. The compensated R, G, B values for each reference, denoted as $R'_i$, $G'_i$, and $B'_i$, i=1, 2, ..., N, are computed as per Eqs. (19)-(21) in which $R_i$, $G_i$, $B_i$ are the R, G, B values for the i-th original reference of the Golden Sensor.

$$R'_i = R'_{adjust} \cdot R_i, \quad (19)$$

$$G'_i = G_{adjust}{}^i \cdot G_i \quad (20)$$

$$B'_i = B_{adjust}{}^i \cdot B_i \quad (21)$$

The compensated Cb and Cr values, $Cb'_i$ and $Cr'_i$, for each compensated reference may then be computed using $R'_i$, $G'_i$ and $B'_i$ as given by Eqs. (1)-(3), i=1, 2, ..., N.

The compensated references may then be used for AWB in a digital system incorporating the target image sensor. In one or more embodiments of the invention, portions of the reference compensation method may be performed in the digital system to compensate the AWB references prior to the initial use of AWB in the digital system after the digital system is activated (e.g., each time a digital camera is turned on). In such embodiments, the average R, G, B adjustments values are predetermined as described above (steps 902, 904) and stored in the digital system along with the AWB references generated using the original image sensor. The actual compensation (steps 906, 908) may then be performed when the digital system is activated. In some embodiments of the invention, the reference compensation method may be implemented in a system used to calibrate individual image sensors during manufacture of digital systems incorporating the image sensors. In such embodiments, the original AWB references are compensated for a particular image sensor, i.e., the target image sensor, as previously described. The compensated AWB references are then stored in the digital system incorporating the target image sensor.

Figure 9A:
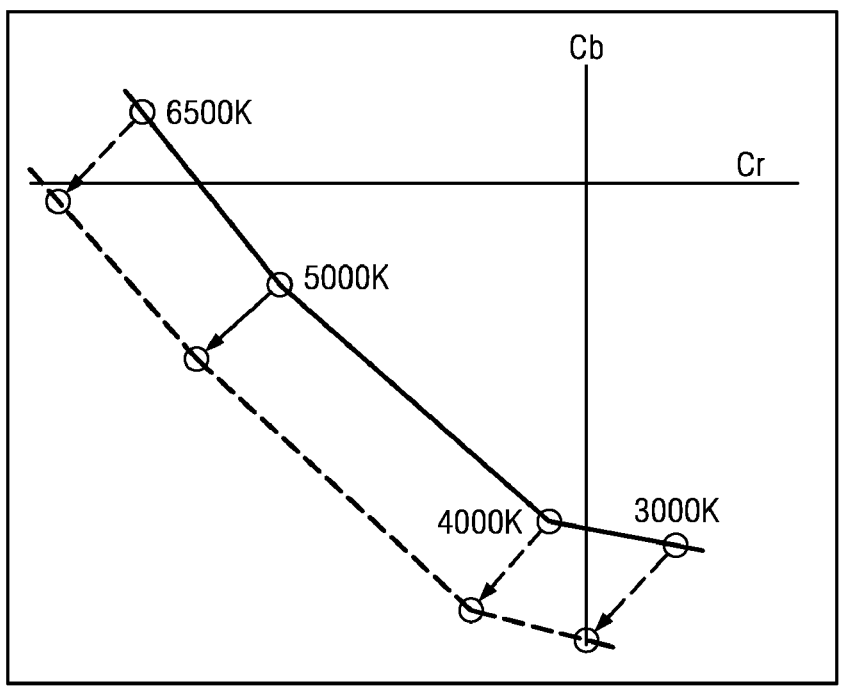
FIGS. 9A and 9B show example AWB reference curves in accordance with one or more embodiments of the invention.
Figure 9B:
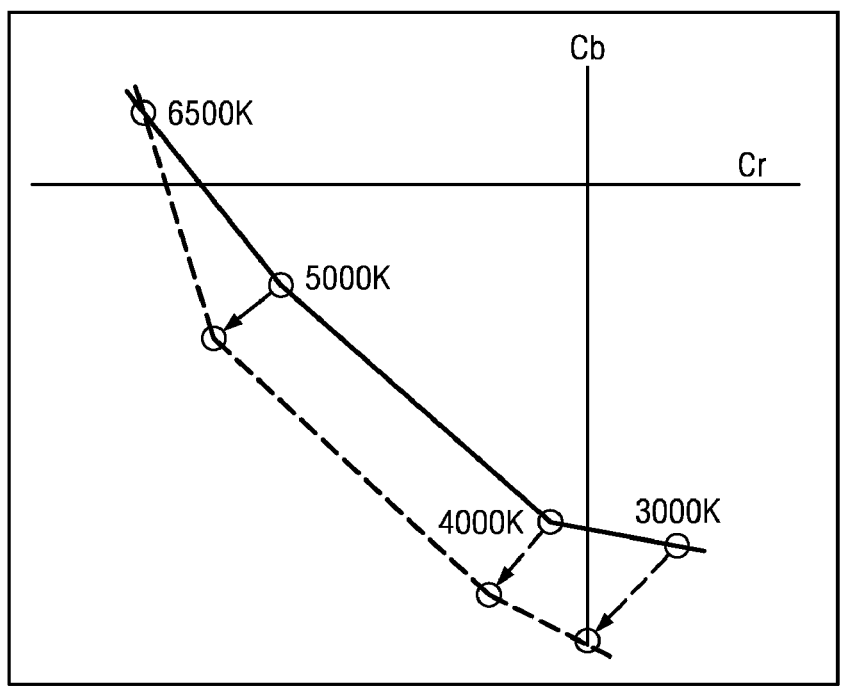

FIGS. 9A and 9B show white balance curves illustrating the effects of the strength adjustment $k_i$. In these figures, four references are assumed, one for each of four color temperatures: 6500K, 5000K, 4000K, and 3000K. The solid line is the white balance curve for the original references and the dotted line is the white balance curve for the compensated references. Further, 5000K was used in capturing the gray patch images.

If $k_i$=1 for i=1, 2, ... N, equal strengths are applied when computing the R, G, B adjustment factors for all references, and therefore each reference point in the white balance curve is adjusted by the same amount. As a result, the entire original white balance curve is shifted to pass the point having R, G, B values of ($R_c$, $G_c$, $B_c$). This amounts to a translation operation of the reference curve, as shown in FIG. 9A.

Different adjustment strengths may be applied to individual references to further improve the accuracy of the adjustment or achieve a preferred tone at certain color temperatures. Using different $k_i$ values, an approximate rotation operation of the original white balance curve can be achieved, as shown in FIG. 9B. In FIG. 9B, the adjustments strengths used are $k_{6500}$=0, $k_{5000}$=0.5, $k_{4000}$=0.75, and $k_{3000}$=1. The adjustment strength $k_i$ provides for much greater flexibility and capability in compensating references for individual image sensors.

Embodiments of AWB methods using references turned and/or compensated as described herein described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized programmable accelerators. A stored program in an onboard or external (flash EEP) ROM or FRAM may be used to implement the video signal processing including embodiments of the methods for image noise filtering described herein. Analog-to-digital converters and digital-to-analog converters provide coupling to the real world, modulators and demodulators (plus antennas for air interfaces) can provide coupling for transmission waveforms, and packetizers can provide formats for transmission over networks such as the Internet.

Embodiments of methods described herein may be implemented in hardware, software, firmware, or any combination thereof. If implemented at least partially in software, the software may be executed in one or more processors, such as a microprocessor, application specific integrated circuit (ASIC), field programmable gate array (FPGA), or digital signal processor (DSP). Software embodying the methods may be initially stored in a computer-readable medium (e.g., memory, flash memory, a DVD, USB key, etc.) and loaded and executed by a processor. Further, the computer-readable medium may be accessed over a network or other communication path for downloading the software. In some cases, the software may also be provided in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Figure 10:
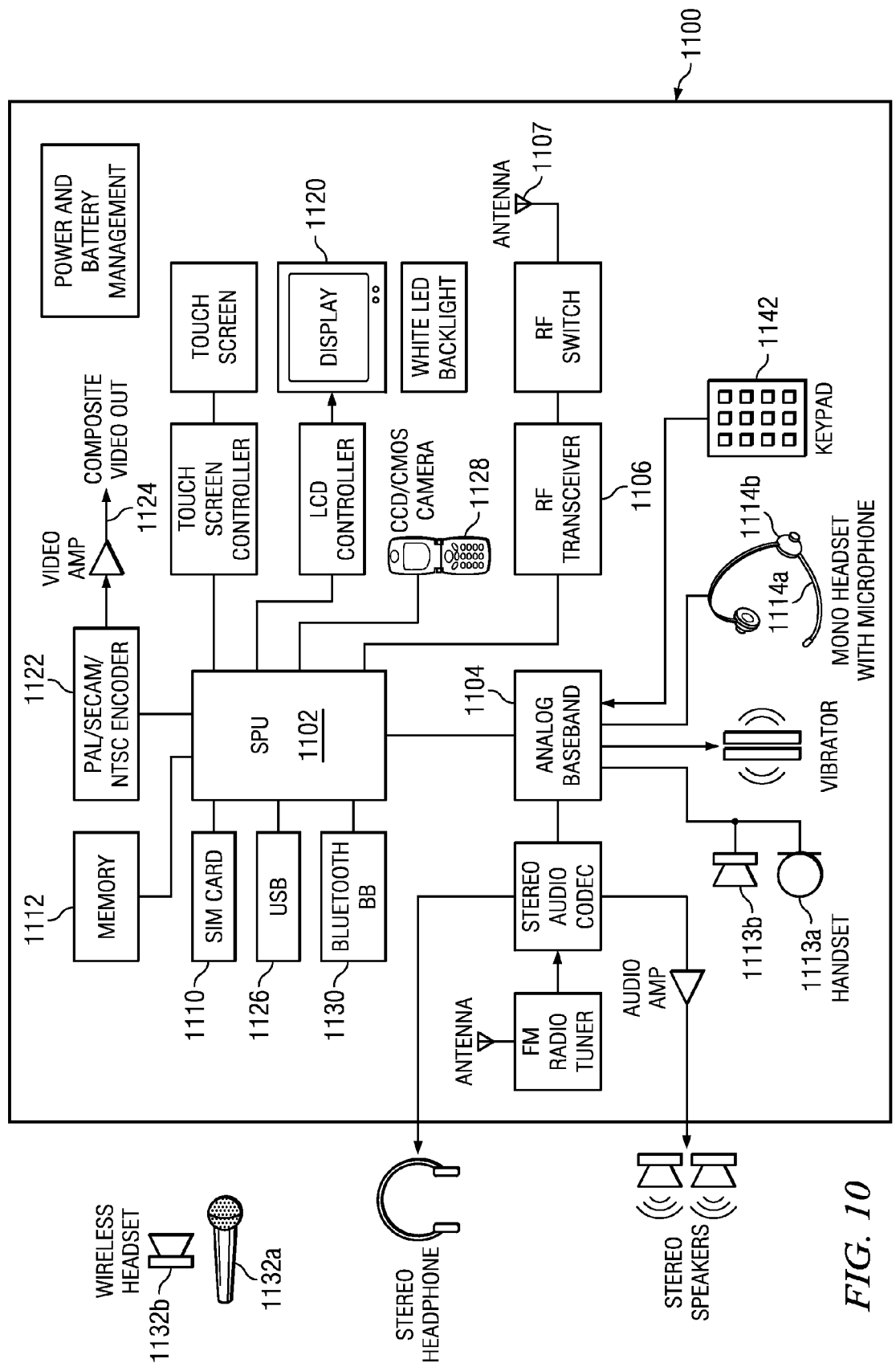
FIGS. 10 and 11 show block diagrams of digital systems in accordance with one or more embodiments of the invention.
Figure 11:
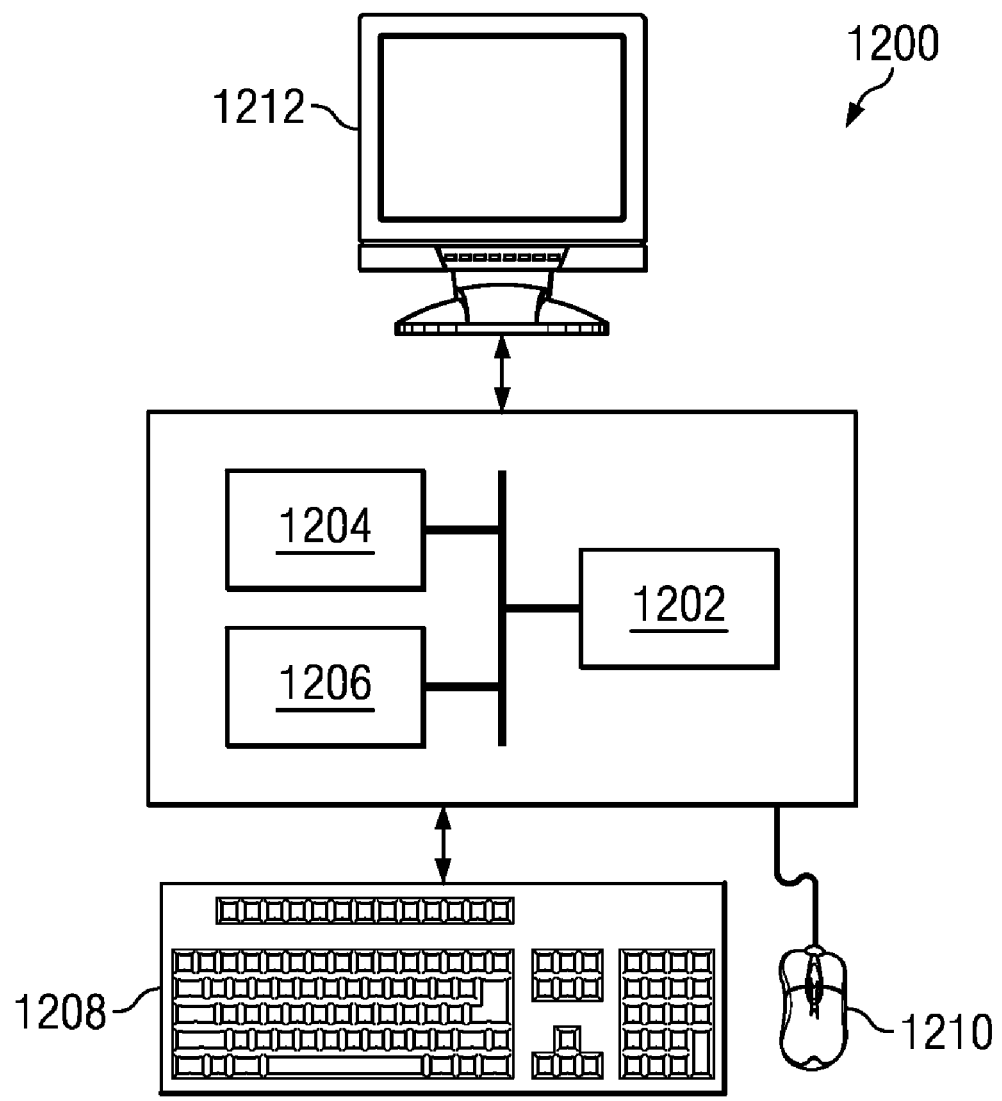

Embodiments of AWB methods using references turned and/or compensated as described herein may be implemented for virtually any type of digital system (e.g., a desk top computer, a laptop computer, a handheld device such as a mobile (i.e., cellular) phone, a personal digital assistant, a digital camera, etc., with functionality to capture digital image data using an image sensor. FIGS. 10 and 11 show block diagrams of illustrative digital systems.

FIG. 10 is a block diagram of a digital system (e.g., a mobile cellular telephone) (1100) that may be configured to perform an AWB method using references tuned and/or compensated as described herein. The signal processing unit (SPU) (1102) includes a digital signal processor system (DSP) that includes embedded memory and security features. The analog baseband unit (1104) receives a voice data stream from handset microphone (1113a) and sends a voice data stream to the handset mono speaker (1113b). The analog baseband unit (1104) also receives a voice data stream from the microphone (1114a) and sends a voice data stream to the mono headset (1114b). The analog baseband unit (1104) and the SPU (1102) may be separate integrated circuits. In many embodiments, the analog baseband unit (1104) does not embed a programmable processor core, but performs processing based on configuration of audio paths, filters, gains, etc. being setup by software running on the SPU (1102). In some embodiments, the analog baseband processing is performed on the same processor and can send information to it for interaction with a user of the digital system (1100) during a call processing or other processing.

The display (1120) may also display pictures and video streams received from the network, from a local camera (1128), or from other sources such as the USB (1126) or the memory (1112). The SPU (1102) may also send a video stream to the display (1120) that is received from various sources such as the cellular network via the RF transceiver (1106) or the camera (1126). The SPU (1102) may also send a video stream to an external video display unit via the encoder (1122) over a composite output terminal (1124). The encoder unit (1122) may provide encoding according to PAL/SECAM/NTSC video standards.

The SPU (1102) includes functionality to perform the computational operations required for video encoding and decoding. The video encoding standards supported may include, for example, one or more of the JPEG standards, the MPEG standards, and the H.26x standards. In one or more embodiments of the invention, the SPU (1102) is configured to perform the computational operations of an AWB method using references tuned and/or compensated as described herein. In one or more embodiments of the invention, the SPU (1102) is also configured to perform the computational operations of a reference compensation method as described herein. Software instructions implementing the method(s) may be stored in the memory (1112) and executed by the SPU (1102) as part of capturing digital image data, e.g., pictures and video streams.

FIG. 11 shows a digital system (1200) (e.g., a personal computer) that includes a processor (1202), associated memory (1204), a storage device (1206), and numerous other elements and functionalities typical of digital systems (not shown). In one or more embodiments of the invention, a digital system may include multiple processors and/or one or more of the processors may be digital signal processors. The digital system (1200) may also include input means, such as a keyboard (1208) and a mouse (1210) (or other cursor control device), and output means, such as a monitor (1212) (or other display device). The digital system (1200) may also include an image capture device (not shown) that includes circuitry (e.g., optics, a sensor, readout electronics) for capturing still images and/or video sequences. The digital system (1200) may include functionality to perform an AWB method using references tuned and/or compensated as described herein on the captured still images and/or video sequences. The digital system (1200) may be connected to a network (e.g., a local area network (LAN), a wide area network (WAN) such as the Internet, a cellular network, any other similar type of network and/or any combination thereof) via a network interface connection (not shown). Those skilled in the art will appreciate that these input and output means may take other forms.

Further, those skilled in the art will appreciate that one or more elements of the aforementioned digital system (1200) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform embodiments of the invention may be stored on a computer readable medium such as a compact disc (CD), a diskette, a tape, a file, memory, or any other computer readable storage device. The software instructions may be distributed to the digital system (1200) via ia (e.g., floppy disk, optical disk, flash memory, USB key), via a transmission path from computer readable media on another digital system, etc.

While the invention has been described with respect to a limited number of embodiments, those skilled in the art, having benefit of this disclosure, will appreciate that other embodiments can be devised which do not depart from the scope of the invention as disclosed herein. It is therefore contemplated that the appended claims will cover any such modifications of the embodiments as fall within the true scope and spirit of the invention.

What is claimed is:

1. A method for compensating an automatic white balance (AWB) reference generated for a first image sensor, the method comprising:
   computing a red adjustment factor, a green adjustment factor, and a blue adjustment factor based on an average red value, an average green value, and an average blue value of the first image sensor and an average red value, an average green value, and an average blue value of a second image sensor; and
   modifying a red value, a green value, a blue value, and chromaticity values of the AWB reference based on the red adjustment factor, the green adjustment factor, and the blue adjustment factor to generate a compensated reference for the second image sensor.

2. The method of claim 1, wherein computing a red adjustment factor comprises:
   computing the red adjustment factor as the average red value of the second image sensor divided by the average red value of the first image sensor;
   computing the green adjustment factor as the average green value of the second image sensor divided by the average green value of the first image sensor; and
   computing the blue adjustment factor as the average blue value of the second image sensor divided by the average blue value of the first image sensor.

3. The method of claim 2, wherein a strength factor predetermined for the AWB reference is applied to each of the red adjustment factor, the green adjustment factor, and the blue adjustment factor.

4. The method of claim 1, further comprising:
   capturing a first image of an achromatic surface at a color temperature using the first image sensor; and
   computing the average red value, the average green value, and the average blue value of the first image sensor as an average of red values, an average of green values, and an average of blue values, respectively, of at least a subset of pixels in the first image.

5. The method of claim 4, further comprising:
   capturing a second image of the achromatic surface at the color temperature using the second image sensor; and
   computing the average red value, the average green value, and the average blue value of the second image sensor as an average of red values, an average of green values, and an average of blue values, respectively, of at least a subset of pixels in the second image.

6. The method of claim 1, wherein modifying a red value further comprises:
   computing a compensated red value as a product of the red value and the red adjustment value;
   computing a compensated green value as a product of the green value and the green adjustment value; and
   computing a compensated blue value as a product of the red value and the blue adjustment value.

7. The method of claim 6, wherein modifying a red value further comprises:
   computing chromaticity values for the compensated reference based on the compensated red value, the compensated green value, and the compensated blue value.

8. The method of claim 7, wherein computing chromaticity values further comprises computing the chromaticity values by computing $$Y = \frac{77R + 150G + 29B + 128}{256}$$

-continued $$C_b = \frac{-43R - 85G + 128B}{Y+1}$$

$$C_r = \frac{128R - 107G - 21B}{Y+1}$$

wherein R is the compensated red value, G is the compensated green value, B is the compensated blue value, $C_b$ and $C_r$ are the chromaticity values, and Y is a luminance value.

9. A digital system comprising:
a processor;
a first image sensor; and
an automatic white balance (AWB) component, wherein the automatic white balance component is operable to use a first plurality of references to white balance digital images captured using the first image sensor, and wherein each reference of the first plurality of references is generated by a reference compensation method comprising:
   computing a red adjustment factor, a green adjustment factor, and a blue adjustment factor based on an average red value, an average green value, and an average blue value of the first image sensor and an average red value, an average green value, and an average blue value of a second image sensor; and
   modifying a red value, a green value, a blue value, and chromaticity values of a corresponding reference in a second plurality of references based on the red adjustment factor, the green adjustment factor, and the blue adjustment factor, wherein the second plurality of references is generated using the second image sensor.

10. The digital system of claim 9, wherein computing a red adjustment factor comprises:
   computing the red adjustment factor as the average red value of the first image sensor divided by the average red value of the second image sensor;
   computing the green adjustment factor as the average green value of the first image sensor divided by the average green value of the second image sensor; and
   computing the blue adjustment factor as the average blue value of the first image sensor divided by the average blue value of the second image sensor.

11. The digital system of claim 10, wherein a strength factor predetermined for the reference is applied to each of the red adjustment factor, the green adjustment factor, and the blue adjustment factor.

12. The digital system of claim 9, wherein the reference compensation method further comprises:
   capturing a first image of an achromatic surface at a color temperature using the first image sensor;
   computing the average red value, the average green value, and the average blue value of the first image sensor as an average of red values, an average of green values, and an average of blue values, respectively, of at least a subset of pixels in the first image;
   capturing a second image of the achromatic surface at the color temperature using the second image sensor; and
   computing the average red value, the average green value, and the average blue value of the second image sensor as an average of red values, an average of green values, and an average of blue values, respectively, of at least a subset of pixels in the second image.

13. The digital system of claim 9, wherein modifying a red value further comprises:
   computing a compensated red value as a product of the red value and the red adjustment value;
   computing a compensated green value as a product of the green value and the green adjustment value;
   computing a compensated blue value as a product of the red value and the blue adjustment value; and
   computing chromaticity values for the compensated reference based on the compensated red value, the compensated green value, and the compensated blue value.

14. The digital system of claim 13, wherein computing chromaticity values further comprises computing the chromaticity values by computing $$Y = \frac{77R + 150G + 29B + 128}{256}$$

$$C_b = \frac{-43R - 85G + 128B}{Y+1}$$

$$C_r = \frac{128R - 107G - 21B}{Y+1}$$

wherein R is the compensated red value, G is the compensated green value, B is the compensated blue value, $C_b$ and $C_r$ are the chromaticity values, and Y is a luminance value.

15. The digital system of claim 11, wherein the average red value, the average green value, and the average blue value of the first image sensor, the average red value, the average green value, and the average blue value of the second image sensor, and the second plurality of references are stored in a memory of the digital system, and wherein computing a red adjustment factor and modifying a red value are performed in the digital system.

* * * * *